United States Patent
Wetterling et al.

(10) Patent No.: US 6,228,899 B1
(45) Date of Patent: May 8, 2001

(54) PRODUCTION OF FLEXIBLE POLYURETHANE FOAMS

(75) Inventors: Monika Wetterling; Marita Schuster, both of Senftenberg; Bernd Güttes, Sallagast; Simone Kuhn, Lauchhammer, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/252,260

(22) Filed: Feb. 18, 1999

(51) Int. Cl.⁷ .................................. C08G 18/14

(52) U.S. Cl. ..................... 521/170; 521/174; 521/175

(58) Field of Search .................... 521/174, 175, 521/170

(56) References Cited

U.S. PATENT DOCUMENTS 4,288,562 * 9/1981 Kresta et al. ..................... 521/174

* cited by examiner

*Primary Examiner*—John Cooney
(74) *Attorney, Agent, or Firm*—Fernando A. Borrego

(57) ABSTRACT

Flexible foams based on polyisocyanate polyaddition products are produced by reacting polyisocyanates with compounds which are reactive toward isocyanates in the presence of catalysts, blowing agents and, if desired, flame retardants, auxiliaries and/or additives, wherein polyether polyalcohols (c) which are obtainable by addition of alkylene oxides onto substances containing active hydrogens are used as substances which are reactive toward isocyanates, where, in a first stage, at least one substance (a) containing 2 or 3 active hydrogens is reacted with at least one alkylene oxide in the presence or absence of catalysts, subsequently at least one substance (b) which contains at least four active hydrogens and, if desired, further catalyst is added to the reaction mixture from the first stage and this mixture is then reacted in a second stage with at least one alkylene oxide.

9 Claims, No Drawings

PRODUCTION OF FLEXIBLE POLYURETHANE FOAMS

The present invention relates to a process for producing flexible foams based on polyisocyanate polyaddition products by reacting polyisocyanates with compounds which are reactive toward isocyanates in the presence of catalysts, blowing agents and, if desired, flame retardants, auxiliaries and/or additives and to the flexible foams which can be produced using this process.

The production of flexible polyurethane foams by reacting polyisocyanates, for example aromatic diisocyanates, with compounds which are reactive toward isocyanates, for example polyether polyalcohols and/or polyester polyalcohols, hereinafter also referred to generally as polyols, and, if desired, chain extenders and/or crosslinkers in the presence of catalysts, blowing agents and, if desired, flame retardants, auxiliaries and/or additives is generally known. An overview of polyols, their preparation, properties and applications in polyurethane chemistry is given in, for example, "Kunststoff-Handbuch", Volume 7, Polyurethane, 3rd edition, 1993, edited by G. Oertel, Carl Hanser Verlag, Munich.

Furthermore, it is known that flexible foams having an increased hardness can be produced by using, in addition to customary polyols having an average functionality of from 2 to 3, polyols having a higher functionality which can be prepared, for example, by addition of alkylene oxides onto initiator substances having a functionality of at least 4. This molecular addition of the alkylene oxides can be carried out as described in U.S. Pat. Nos. 4,111,865, 4,288,562 or DD-A 248129, in a mixture comprising customary 3-functional initiator substances and at least 4-functional initiator substances, where the initiator substances can be mixed before the alkoxylation or else can be reacted separately with the alkylene oxides and only subsequently mixed as prepolymers and alkoxylated with further alkylene oxides.

Significant disadvantages of these processes are that the alkoxylation, in particular of sugars as substances having a functionality of at least 4, proceeds in an unsatisfactory manner, the reaction mixtures have inhomogeneities and the polyols prepared have an unfavorable molecular weight distribution for the production of highly elastic flexible polyurethane foams.

It is an object of the present invention to develop a process for producing flexible foams based on polyisocyanate polyaddition products by reacting compounds which are reactive toward isocyanates with isocyanates, which flexible foams should have a relatively high hardness, a low compressive set and a high tensile strength.

We have found that this object is achieved by using polyether polyalcohols (c) which are obtainable by addition of alkylene oxides onto substances containing active hydrogens as substances which are reactive toward isocyanates, where, in a first stage, at least one substance (a) containing 2 or 3 active hydrogens is reacted with at least one alkylene oxide in the presence or absence of catalysts, subsequently at least one substance (b) which contains at least four active hydrogens and, if desired, further catalyst is added to the reaction mixture from the first stage and this mixture is then reacted in a second stage with at least one alkylene oxide.

Suitable initiator substances (a) are generally customary compounds which have 2 or 3 active hydrogens. As compounds (a), it is possible to use, for example, aliphatic, araliphatic and/or aromatic amines and/or imines which may bear a hydroxyl group in addition to the amino group or imino group, and preferably ethylene glycol, 1,2- and/or 1,3-propanediol, 1,2-, 1,3- and/or 1,4-butanediol, di- tri- and/or tetra-ethylene, -propylene and/or -butylene glycol, trimethylolpropane and/or glycerol. Furthermore, it is possible to use addition products having a molecular weight of from 100 to 1000 of alkylene oxides onto 2-and/or 3-functional alcohols as compound (a).

The reaction in the first stage by addition of customary alkylene oxides, for example tetrahydrofuran, styrene oxide, 1,3-propylene oxide, 1,2- and/or 1,3 butylene oxide and/or ethylene oxide, preferably ethylene oxide, onto the components (a) and (b) present in the mixture can be carried out by generally known methods. For example, the mixture comprising the initiator substance (a) can be treated at, for example, from 70 to 160° C., preferably from 80 to 150° C., with the alkylene oxide in a customary reactor (stirred tank reactors, tube reactors, etc.) which can be equipped with customary facilities for cooling the reaction mixture. The addition of the alkylene oxides is preferably carried out such that the reaction temperature is within a range from 10 to 160° C., preferably from 80 to 150° C. The reaction times usually depend on the temperatures in the reaction mixture and are thus dependent, inter alia, on the batch size, the reactor type and the cooling facilities. The reaction can be carried out at pressures of from 0.1 MPa and 1 MPa, preferably from 0.1 MPa and 0.7 MPa.

Preferably, a customary amount, for example from 0.02 to 1% by weight, preferably from 0.04 to 0.08% by weight, based on the component (a), of a strong base is added to the initiator substance (a) before and/or during the reaction with the alkylene oxides. As strong base, preference is given to using alkali metal hydroxides, particularly preferably NaOH and/or KOH in dissolved or preferably solid form. For example, the component (a) can, prior to the reaction with the alkylene oxides, be distilled at customary temperatures and under reduced pressure in the presence of the strong bases mentioned, so that the component (a) is present at least partly as alkoxide at the end of the distillation. The component (a) is preferably used as alkoxide in the molecular addition of the alkylene oxides in the first stage.

The reaction product of the first stage usually has a hydroxyl number of from 100 to 1000, preferably from 200 to 900, particularly preferably from 250 to 900, and a functionality of >2.

Subsequent to the first stage, the initiator substance (b) which contains at least 4 active hydrogens is added to the reaction mixture from the first stage which does not necessarily have to have been worked up by customary methods and is preferably intensively mixed with the reaction mixture.

As initiator substance (b), it is possible to use alcohols having a functionality of $\geq 4$, for example sugar alcohols and/or saccharides, preferably pentaerythritol, sorbitol, and/or sucrose. Preference is also given to using addition products having a molecular weight of from 100 to 1000 of alkylene oxides and at least 4-functional alcohols.

It is also possible to add a part, in particular up to 80% by weight, of the initiator substance (b) during the reaction in the first stage. The partial addition of the substance (b) can be carried out all at once at the beginning and/or in portions during the reaction with alkylene oxide in the first stage over a period of 0.5–1.5 h after commencement of the metered addition of the alkylene oxide.

In the process of the present invention, the molar ratio of the initiator substances (a):(b) in the mixture, ie. the molar ratio of (a) used in the first stage and (b) used in the second stage, is usually from 5:1 to 0.2:1, particularly preferably from 2:1 to 0.5:1.

If desired, a strong base as has already been described for the first stage can be added to the reaction product from the first stage before, during or after the addition of the initiator substance (b). Like the initiator substance (a) in the first stage, the initiator substance (b) in the second stage can also be used as alkoxide.

After the addition of the initiator substance (b) to the reaction product from the first stage, the reaction in the second stage by addition of customary alkylene oxides, for example propylene oxide, butylene oxide and/or ethylene oxide, preferably ethylene oxide, onto the components (a) and (b) present in the mixture can be carried out by generally known methods. For example, the reaction mixture can be treated at, for example, from 70 to 160° C., preferably from 80 to 150° C., with the alkylene oxide in a customary reactor (stirred tank reactors, tube reactors, etc.), preferably in the same reactor in which the first stage has been carried out and which is preferably equipped with customary facilities for cooling the reaction mixture. The addition of the alkylene oxides is preferably carried out such that the reaction temperature is within a range from 70 to 160° C., preferably from 80 to 150° C. The reaction times usually depend on the temperatures in the reaction mixture and are thus dependent, inter alia, on the batch size, the reactor type and the cooling facilities. The reaction can be carried out at pressures of from 0.1 MPa and 1 MPa, preferably from 0.1 MPa and 0.7 MPa.

It is also possible to mix a part, in particular up to 40%, of the total component (a) used, into the reaction in the second stage, if desired, together with the initiator substance (b).

The alkoxylation is preferably carried out using ethylene oxide at the conclusion, so that the polyols prepared according to the present invention have terminal oxyethylene units. In particular, from 5 to 30% of ethylene oxide are added on at the end.

The reaction product of the second stage can be purified in a known manner, eg. by almost neutralizing the reaction mixture with mineral acids, for example hydrochloric acid, sulfuric acid and/or preferably phosphoric acid, with organic acids or with carbon dioxide to a pH of usually from 6 to 8, removing the water from the polyether polyalcohol by customary vacuum distillation and filtering off the salts.

The polyol mixture prepared according to the present invention preferably has a mean functionality of from >3 to 7 and a mean hydroxyl number of from 20 to 200. The figures represent average values which can be determined by customary methods.

The production according to the present invention of the flexible polyurethane foams can be carried out by means of reactions which are generally known and described, for example in "Kunststoff-Handbuch" loc. cit., of the polyetherols (c) of the present invention with generally customary isocyanates, for example by direct reaction or using the prepolymer method.

As regards the starting components which can be used for producing the flexible polyurethane foams according to the present invention, the following details may be provided by way of example:

As organic diisocyanates and/or polyisocyanates, it is possible to use, for example, the isocyanates described in DE-A 44 08 430 on page 3, lines 22 to 57.

In addition to the polyether polyalcohols (c) of the present invention, it is possible to use customary polyether polyols, polyester polyols and/or polyether-polyester polyols, for example known polyether polyols having a functionality of from 1.8 to 4.0 and a molecular weight of, on average, from 401 to 8000, as are described, for example, in DE-A 44 08 430, page 3, line 58 to page 4, line 24, and/or polymer-modified polyether polyols, preferably graft polyether polyols, as are described, for example, in DE-A 44 08 430, page 4, lines 25 to 40, as compounds which are reactive toward isocyanates. As compounds which are reactive toward isocyanates, preference is given to using a polyol mixture comprising from 5 to 80% by weight of the polyether polyalcohol (c) of the present invention having a mean functionality of from >3 to 7 and a hydroxyl number of from 20 to 200 and obtainable by addition of alkylene oxides onto substances containing active hydrogens, where, in a first stage, at least one substance (a) containing 2 or 3 active hydrogens is reacted with at least one alkylene oxide in the presence or absence of catalysts, subsequently at least one substance (b) which contains at least 4 active hydrogens and, if desired, further catalyst is added to the reaction mixture from the first stage and this mixture is then reacted with at least one alkylene oxide in a second stage, from 0.1 to 50% by weight of a polyether polyalcohol having a functionality of from 1.8 to 3 and a hydroxyl number of from 20 to 100 mg KOH/g, from 10 to 50% by weight of a graft polyether polyalcohol and from 0.1 to 5% by weight of glycerol, where the percentages by weight are based on the total weight of the polyol mixtures.

As chain extenders and/or crosslinkers, ie. as compounds which are reactive toward isocyanates, it is possible to use, in addition to the polyether polyalcohols according to the present invention, substances which are generally known for this purpose and have a molecular weight of from 18 to 400, as are described, for example, in DE-A 44 08 430 on page 4, line 68 to page 5, line 5.

To accelerate the reaction of the compounds which are reactive toward isocyanates with the isocyanates, it is possible to use generally known catalysts as are described, for example, in DE-A 44 08 430 on page 5, line 52 to page 6, line 3. Blowing agents used can be customary blowing agents, for example those described in DE-A 44 08 430 on page 5, line 30 to line 51. Preference is given to using water, formates and/or carbon dioxide as blowing agents.

To increase the flame resistance of the polyurethanes, it can be advantageous to carry out the reaction of the isocyanates with the compounds which are reactive toward isocyanates in the presence of customary flame retardants as are described, for example, in DE-A 44 08 430 on page 5, line 6 to line 29.

As auxiliaries and additives, it is possible to use customary substances, for example those described in DE-A 44 08 430 on page 6, line 4 to line 16.

Further details regarding the abovementioned other customary auxiliaries and additives may be found in the specialist literature, for example the monograph by J. H. Saunders and K. C. Frisch "High Polymers", Volume XVI, Polyurethanes, Part 1 and 2, Interscience Publishers, 1962 and 1964 or the Kunststoff-Handbuch, Polyurethane, Volume VII, Hanser-Verlag, Munich, Vienna, 1st and 2nd editions, 1966 and 1983.

To produce the flexible polyurethane foams, the organic, modified or unmodified polyisocyanates are reacted with the isocyanate-reactive compounds comprising the polyether polyalcohols (c) of the present invention in the presence of blowing agents, catalysts and, if desired, flame retardants, auxiliaries and/or additives at from 0 to 100° C., preferably from 15 to 80° C., in such ratios that from 0.5 to 2, preferably from 0.8 to 1.3 and in particular about one reactive hydrogen atom(s) is/are present in bound form on the compounds which are reactive toward isocyanates per NCO group and, if water is used as blowing agent, the molar ratio of equivalents of water to equivalents of NCO groups is 0.5–5:1, preferably 0.7–0.95:1 and in particular 0.75–0.85:1.

The flexible PU foams are advantageously produced by the one-shot process by mixing two components A and B. In this method, the compounds which are reactive toward isocyanates, the flame retardants, the blowing agents, the catalysts and, if used, the auxiliaries and/or additives are combined to form the A components and the polyisocyanates, if desired in admixture with flame retardants, auxiliaries and/or additives and inert, physically acting blowing agents are-used as component B. Thus, the A and B components only have to be intensively mixed before production of the flexible polyurethane foams. The reaction mixtures can be foamed in open or closed molds and also to give block foam.

The flexible polyurethane foams produced according to the process of the present invention have densities of from 30 to 150 g/liter, preferably from 40 to 100 g/liter. They have good mechanical properties. The molded foams are preferably used as upholstery elements, eg. as seating upholstery, armrests, headrests, sun visors and safety coverings in vehicle interiors, preferably motor vehicles and aircraft.

The invention is illustrated by the examples below. In the examples, parts are by weight.

EXAMPLE 1

Preparation of the Polyol According to the Present Invention

A 50 l reactor was charged with, in succession, 2.57 kg of glycerol and 0.28 kg of 45% strength aqueous potassium hydroxide solution, flushed with nitrogen and the mixture was heated to 110° C. To form alkoxide, water was distilled off under a reduced pressure of 10 mbar over a period of 2 hours. 10 kg of propylene oxide were subsequently metered in and reacted at 100° C. After a reaction time of 2.5 hours, 6.38 kg of sucrose and 23.3 kg of propylene oxide were added to the reaction mixture in a second stage and were reacted. After reaching a hydroxyl number of 280 mg KOH/g, 1.8 kg of 45% strength aqueous potassium hydroxide solution were metered in and a reduced pressure of 1.5 mbar was subsequently applied for 2 hours. 5.4 kg of this reaction mixture were subsequently introduced into a 50 l reactor, the reactor was flushed with nitrogen and the mixture was heated to 110° C. 37.5 kg of propylene oxide were added to the reaction mixture and were reacted for 7.5 hours. This was followed by addition of 10.7 kg of ethylene oxide and a reaction at 105° C. for 1.5 hours. The polyol mixture was subsequently neutralized with aqueous phosphoric acid, distilled and filtered.

The polyol mixture had the following properties:

| | |
|---|---|
| Hydroxyl number: | 28.5 mg KOH/g |
| Water content: | 0.08% |
| Viscosity at 25° C.: | 1020 mPas |
| Acid number: | 0.09 mg KOH/g |
| pH: | 7.6 |
| Iodine number: | 0.02 meq/g |

EXAMPLE 2

Production of a Flexible Polyurethane Foam Using the Polyol According to the Present Invention The components A and B described below were reacted with one another in a mold such that the molar ratio of the NCO groups to the sum of the hydrogens which are reactive toward isocyanates as 1:1.

The components A and B were intensively mixed at 23° C. for 20 seconds. 700 g of the reaction mixture obtained were introduced into a metal mold having internal dimensions of 40×40×10 cm and heated to 30° C., the mold was closed and the reaction mixture was allowed to foam.

The polyurethane moldings formed were removed from the mold after 8 minutes.

Component A) tolylene diisocyanate 80/20

Component B) polyol component consisting of:

| | |
|---|---|
| 43.5 parts by weight. | of the polyol prepared in Example 1 |
| 20 parts by weight. | of a polyether polyol based on glycerol, propylene oxide and ethylene oxide and having a hydroxyl nunber of 35 mg KOH/g |
| 30 parts by weight. | of an acrylonitrile/styrene-modified polyether polyalcohol having a solids content of 30% |
| 1 part by weight. | of glycerol |
| 0.2 part by weight. | of a catalyst (Niax A1 from Air Products) |
| 0.3 part by weight. | of a catalyst (Dabco X8154 from Air Products) |
| 0.5 part by weight. | of a silicone stabilizer (B8629 from Goldschmidt) |
| 3.5 part by weight. | of water |

The mechanical properties of the flexible polyurethane foam are shown in the table below.

COMPARATIVE EXAMPLE 3

Production of a Flexible Polyurethane Foam Using a Known Polyol

The components A and B described below were reacted with one another in a mold such that the molar ratio of the NCO groups to the sum of the hydrogens which are reactive toward isocyanates was 1:1.

The components A and B were intensively mixed at 23° C. for 10 seconds. 700 q of the reaction mixture obtained were introduced into a metal mold having internal dimensions of 40×40×10 cm and heated to 30° C., the mold was closed and the reaction mixture was allowed to foam.

The polyurethane moldings formed were removed from the mold after 8 minutes.

Component A) tolylene diisocyanate 80/20

Component B) polyol component consisting of:

| | |
|---|---|
| 63.8 parts by weight. | of a polyether polyol based on glycerol, propylene oxide and ethylene oxide and having a hydroxyl number of 35 mg KOH/g |
| 30 parts by weight. | of an acrylonitrile/styrene-modified polyether polyalcohol having a solids content of 30% |
| 1 part by weight. | of glycerol |
| 0.2 part by weight. | of a catalyst (Niax A1 from Air Products) |
| 0.3 part by weight. | of a catalyst (Dabco X8154 from Air Products) |

-continued

| | |
|---|---|
| 0.5 part by weight. | of a silicone stabilizer (B8629 from Goldschmidt) |
| 3.5 part by weight. | of water |

The mechanical properties of the flexible polyurethane foam are shown in the table below.

TABLE

| Example | Density in accordance with DIN 53420 [g/l] | Compressive set in accordance with DIN 53572 [%] | Elongation at break in accordance with DIN 53571 [%] | Rebound resilience [%] | Compressive strength in accordance with DIN 53571 [kPa] |
|---|---|---|---|---|---|
| 2 | 33 | 7.1 | 164 | 66 | 3.6 |
| 3 | 33 | 7.6 | 164 | 67 | 2.2 |

The object of the present invention, ie. to provide flexible foams having a higher hardness and a lower compressive set, was thus able to be achieved using the methods of the present invention.

We claim:

1. A process for producing flexible foams based on polyisocyanate polyaddition products comprising reacting polyisocyanates with compounds which are reactive toward isocyanates in the presence of catalysts, blowing agents, and optionally, flame retardants, auxiliaries and/or additives, wherein the compounds reactive toward isocyanates comprise polyether polyalcohols (c) which are obtained by reacting, in a first stage, at least one substance (a) containing 2 or 3 active hydrogens with at least one alkylene oxide in the presence or absence of catalysts, subsequently adding at least one substance (b) which contains at least four active hydrogens and, optionally, further catalyst to the reaction mixture from the first stage, and reacting the mixture in a second stage with at least one alkylene oxide.

2. A process as claimed in claim 1, wherein substance (a) comprises ethylene glycol, 1,2- and/or 1,3-propanediol, 1,2-, 1,3- and/or 1,4-butanediol, di, tri- and/or tetra-ethylene, propylene and/or butylene glycol, trimethylolpropane and/or glycerol.

3. A process as claimed in claim 1, wherein substance (a) is selected from the group consisting of addition products having a molecular weight of from 100 to 1000 of alkylene oxides and 2- and/or 3-functional alcohols.

4. A process as claimed in claim 1, wherein substance (b) comprises pentaerythritol, sorbitol and/or sucrose.

5. A process as claimed in claim 1, wherein substance (b) is selected from the group consisting of addition products having a molecular weight of from 100 to 1000 of alkylene oxides and at least 4-functional alcohols.

6. A process as claimed in claim 1, wherein, in the second stage, ethylene oxide is finely added onto the polyether polyalcohol.

7. A process as claimed in claim 1, wherein the polyether polyalcohols (c) have a mean functionality of from >3 to 7 and a mean hydroxyl number of from 20 to 200.

8. A process as claimed in claim 1, wherein the compounds which are reactive toward isocyanate comprise:
   from 5 to 80% by weight of a polyether alcohol having a mean functionality of from >3 to 7 and a hydroxyl number of from 20 to 200 and obtained by reacting, in a first state, at least one substance (a) containing 2 or 3 active hydrogens with at least one alkylene oxide in the presence or absence of catalysts, subsequently adding at least one substance (b) which contains at least 4 active hydrogens and, if desired, further catalyst to the reaction mixture from the first stage and reacting the mixture with at least one alkylene oxide in a second stage,
   from 0.1 to 50% by weight of a polyether polyalcohol having a functionality of from 1.8 to 3 and a hydroxyl number of from 20 to 100 mg KOH/g,
   from 10 to 50% by weight of a graft polyether polyalcohol and from 0.1 to 5% by weight of glycerol.

9. A flexible foam based on polyisocyanate polyaddition products obtained from a process as claimed in any of claims 1 to 8.

* * * * *